(12) United States Patent
Oak

(10) Patent No.: US 7,081,585 B2
(45) Date of Patent: Jul. 25, 2006

(54) SUPER STRUCTURE FOR ROOF PATIO SOLAR PLANT

(76) Inventor: Eugene Oak, 610. S. Van Ness Ave., Los Angeles, CA (US) 90005

( * ) Notice: Subject to any disclaimer, the term of this patent is extended or adjusted under 35 U.S.C. 154(b) by 65 days.

(21) Appl. No.: 10/979,100

(22) Filed: Nov. 2, 2004

(65) Prior Publication Data

US 2006/0090788 A1 May 4, 2006

(51) Int. Cl.
*H01L 31/048* (2006.01)

(52) U.S. Cl. .................. 136/251; 136/244; 136/291; 136/246; 52/173.3; 257/433

(58) Field of Classification Search .............. 136/251, 136/244, 291, 246; 52/173.3; 257/433
See application file for complete search history.

(56) References Cited

U.S. PATENT DOCUMENTS

| | | | |
|---|---|---|---|
| 4,132,570 A * | 1/1979 | Caruso et al. | 136/244 |
| 4,204,523 A * | 5/1980 | Rothe | 126/623 |
| 4,226,256 A * | 10/1980 | Hawley | 136/244 |
| 4,269,173 A * | 5/1981 | Krueger et al. | 126/634 |
| 4,611,090 A * | 9/1986 | Catella et al. | 136/251 |
| 4,636,577 A * | 1/1987 | Peterpaul | 136/206 |
| 4,860,509 A * | 8/1989 | Laaly et al. | 52/173.3 |
| 5,125,608 A * | 6/1992 | McMaster et al. | 248/163.1 |
| 5,232,518 A * | 8/1993 | Nath et al. | 136/251 |
| 5,333,421 A * | 8/1994 | McKenna | 52/86 |
| 5,409,549 A * | 4/1995 | Mori | 136/244 |
| 5,990,414 A * | 11/1999 | Posnansky | 136/244 |
| 6,065,255 A * | 5/2000 | Stern et al. | 52/173.3 |
| 6,065,256 A * | 5/2000 | Joko et al. | 52/173.3 |
| 6,606,830 B1 * | 8/2003 | Nagao et al. | 52/173.3 |
| 7,012,188 B1 * | 3/2006 | Erling | 136/251 |
| 2005/0072060 A1 * | 4/2005 | Moncho et al. | 52/79.1 |
| 2005/0138867 A1 * | 6/2005 | Zhao | 52/79.1 |
| 2005/0241246 A1 * | 11/2005 | Sinha et al. | 52/173.3 |

FOREIGN PATENT DOCUMENTS

| | | | | |
|---|---|---|---|---|
| JP | 57-169545 A | * | 10/1982 | |
| JP | 60-50348 A | * | 3/1985 | |
| JP | 61-99384 A | * | 5/1986 | |
| JP | 8-126438 A | * | 5/1996 | |
| JP | 10-317622 A | * | 12/1998 | |
| JP | 2003-56130 A | * | 2/2003 | |
| JP | 2004-140256 A | * | 5/2004 | |

* cited by examiner

*Primary Examiner*—Alan Diamond
(74) *Attorney, Agent, or Firm*—Eugene Oak

(57) ABSTRACT

Supporting frame structure for installing solar cell module plates and incidental facilities on a house roof is provided. The supporting structure has a shape of pluralities of slope structure accompanied with cleaning accesses mounted on a rectangular cube frame. Side view of the slope structure forms a rectangular triangle on a square. The angle between the sloped top surface and the horizontal base is 3 to 75 degrees depend on the latitude of the geometric location of the place where the solar cell plate modules are installed. The maintenance access is a space through which a worker easily access to the solar cell module plates to clean the surface thereof and to replace the plates.

3 Claims, 6 Drawing Sheets

SUPER STRUCTURE FOR ROOF PATIO SOLAR PLANT

FIELD OF INVENTION

Current application relates to a metal supporting frame structure to install solar cell module plates and incidental facilities on a house roof.

BACKGROUND OF THE INVENTION

Since the development of photovoltaic solar cell, many kinds of solar cell itself and methods of assembling the cells into a module, including the methods of assembling the solar cells for mounting on a house roof, have been introduced. Those methods teach only how to assemble each solar cell and the parts to connect them in a planar shape. According to those illustrations, lots of heavy metal parts and ceramic insulators are necessary to make whole solar cell modules for mounting them on a roof of a house. The final solar cell module for a house may too heavy for the roof of a house. The heavy weight of the module limits the number of module plates installed on a roof and the magnitude of the power that can be obtained from them. In addition, it is not easy to clean the surface of the module plates. So, the efficiency of generating electricity is easily decreased due to the polluted air and dusts of big cities. It is the purpose of the current application to eliminate such limits.

DESCRIPTION OF THE PRIOR ARTS

U.S. Pat. No. 4,238,912 to Mac Donald, U.S. Pat. No. 4,860,509 to Laaly, et al., U.S. Pat. No. 5,232,518 to Nath, et al., U.S. Pat. No. 5,409,549 to Mori, U.S. Pat. No. 5,990,414 to Posnansky, U.S. Pat. No. 6,065,256 to Joko, et al., U.S. Pat. No. 6,606,830 to Nagao, et al., and U.S. Pat. No. 4,636,577 to Peterpaul illustrate a solar panel module for directly mounting to a roof surface. Irrespective of the way of assembling the solar cells, all their method needs lots of connection parts of heavy weights.

U.S. Pat. No. 4,204,523 to Rothe illustrates a support for mounting solar energy collectors on a roof of a building, which roof has an opening in the roof sheeting, includes a shell having a generally flat rectangular base and an upstanding edge secured to, and extending about, the periphery of the shell. The frame is configured and dimensional to correspond to the outer surface shape of the roof sheeting and to permit mating receipt thereof in the opening of the sheeting. The mounting support consists of a flat, rectangular shell having a shell edge and a shell bottom. An outer frame surrounds this flat shell, which in its shape is adapted to the shape of the roof sheeting. Thereby, outer frame imitates the form of the often-used roof tiles or any other type of roof sheeting, so that an even sealing off is obtained when inserted into the existing roof sheeting in a manner in which the roofing tiles seal off with each other. The purpose of this solar cell support is to seal off the openings of the roofing.

None of the prior arts illustrate a support frame structure for mounting solar cell modules on a house roof with maximizing the collecting ability of the solar energy.

SUMMARY OF THE INVENTION

It is purpose of the current application to provide a supporting frame structure to render maximum solar energy collecting ability to solar cell modules, which are installed on a house roof. It is another purpose of the current application to provide environmentally affirmative views to the neighborhoods. The support frame structure is comprised of aluminum pipes, steel pipes, plastic plates, and woods. The frame structure has at least four vertical posts made of metal pipes, which are supporting other metal pipes, which constitute a planar frame for upper horizontal frame. A patio with a sloped top, at least 2 meter high, is developed between the roof of the house and the bottom of the top surface of the frame throughout the whole roof. This space is for install incidental facilities of the solar power systems such as pumps, batteries, and water tanks and for maintaining those facilities. As a result, the side view of the roof top frame structure, on which the solar cell panels are mounted, forms a rectangular triangle on a square. The angle between the sloped surface and the horizontal base is 3 to 75 degrees depend on the latitude of the geometric location of the place where the solar cell plate modules are installed. Maintenance accesses are developed between the solar cell module mounts. This maintenance access enables frequent cleaning and maintaining of the solar cell modules to maximize the solar energy collecting ability. The reinforced self-sustaining structure of the current application enables installing more solar cells on the roof and gathering more solar energy.

DETAILED DESCRIPTION OF THE PREFERRED EMBODIMENT

Figure 1:
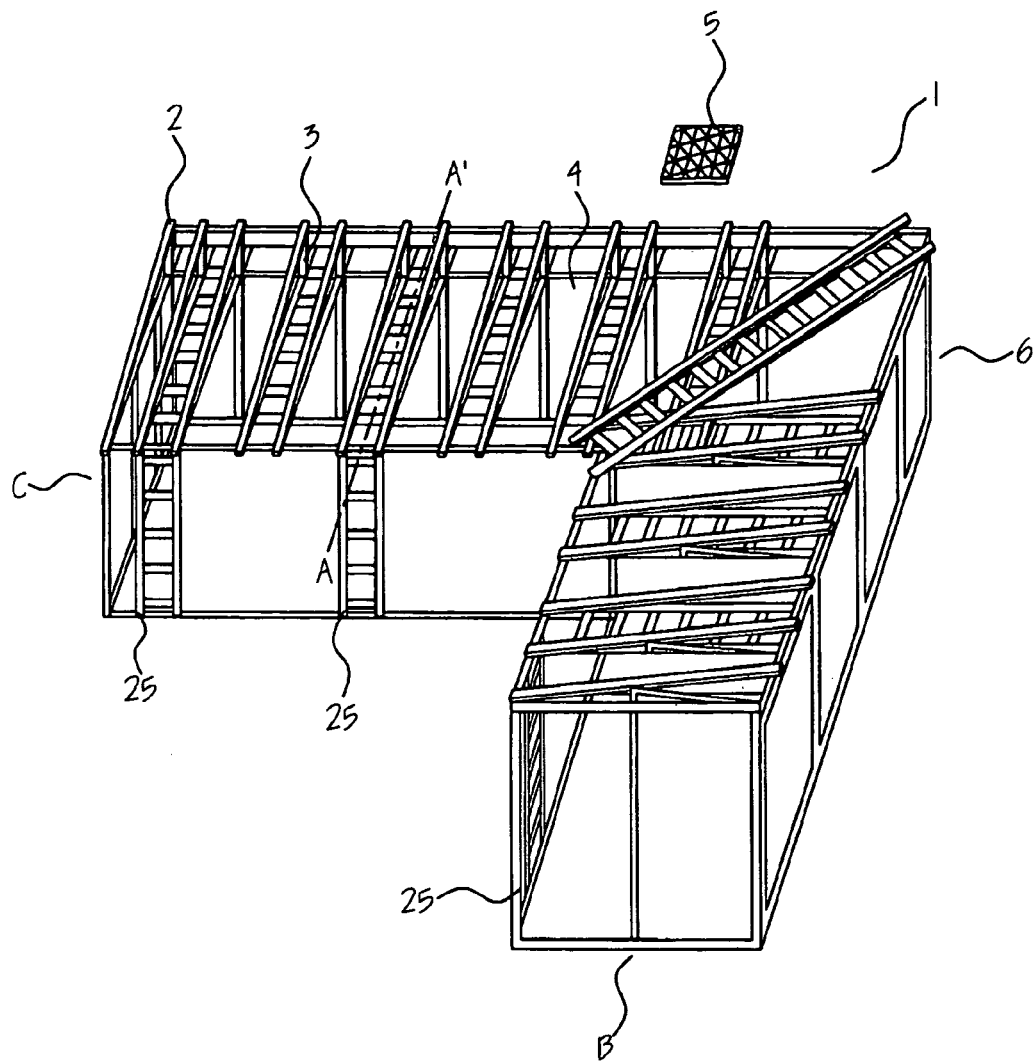
FIG. 1 is a perspective view of the solar cell module plate supporting frame structure.

FIG. 1 is a perspective view of the solar cell module panel supporting frame structure (1) of the current application. The structure (1) is made of 5 cm by 5 cm (2 inch×2 inch) square carbon steel pipes (2) welded each other. Therefore, the structure (1) is self-sustaining. Upper face of the solar cell module panel supporting frame structure (1) is equipped with maintenance accesses (3) and solar cell module mounts (4). Solar cell module plates (5) of 180 cm by 76 cm are mounted on the mounts (4).

Figure 2:
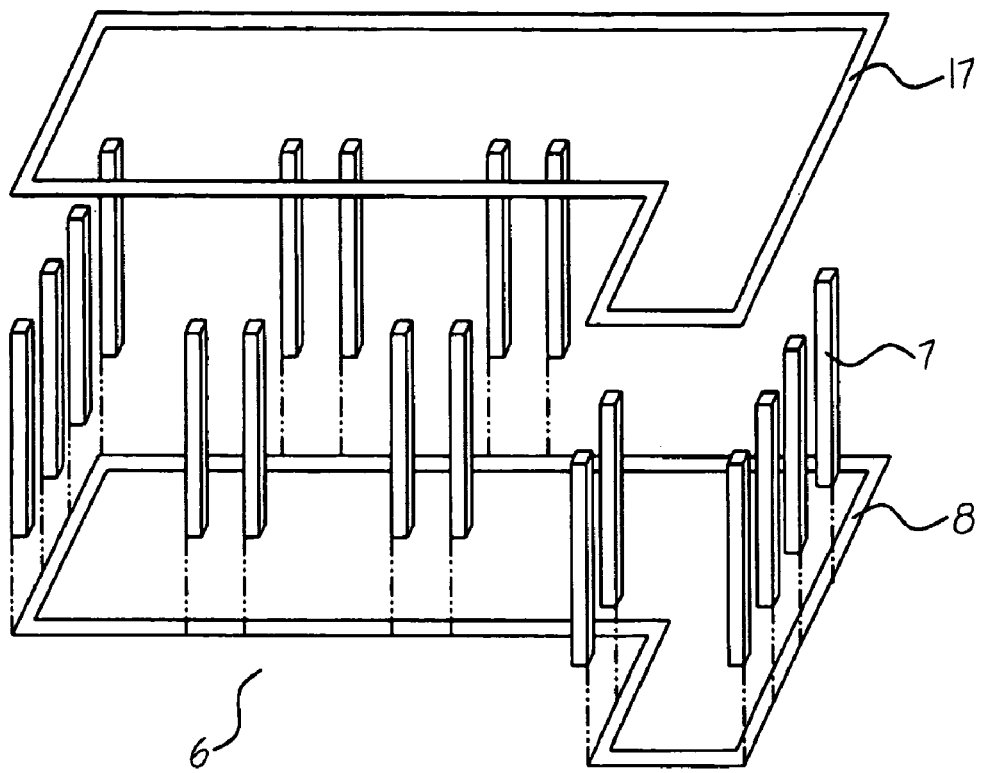
FIG. 2 is an exploded view of the lower part of the solar cell module plate supporting frame structure.

FIG. 2 is an exploded view of the lower part (6) of the solar cell module panel supporting frame structure (1). The lower part (6) of the structure (1) is in cubic form. Twenty 5 cm by 5 cm square carbon steel pipes (7) of 274 cm (9 feet) long are welded vertically on an "L" shape base (8) made with the same 5 cm by 5 cm square carbon steel pipes by cutting and welding 600 cm (20 feet) long stock. The dimension of the "L" shape base (8) is seen in the FIG. 3. The longest side (9) is 1,890 cm (63 feet). Second longest side (10) is 1,110 cm (37 feet). The side (11), facing the longest side (9), is divided into 1,230 cm (41 feet) long side (12) and 630 cm (21 feet) long side (13). The other side (14), facing the second longest side (10), is divided into 630 cm (21 feet) long side (15) and 480 cm (16 feet) long side (16). Another "L" shape structure, having the same geometry and dimension as the base (8), is made of same material and welded to the upper face of the twenty vertical carbon steel pipes (7) to form an upper base (17).

Figure 3:
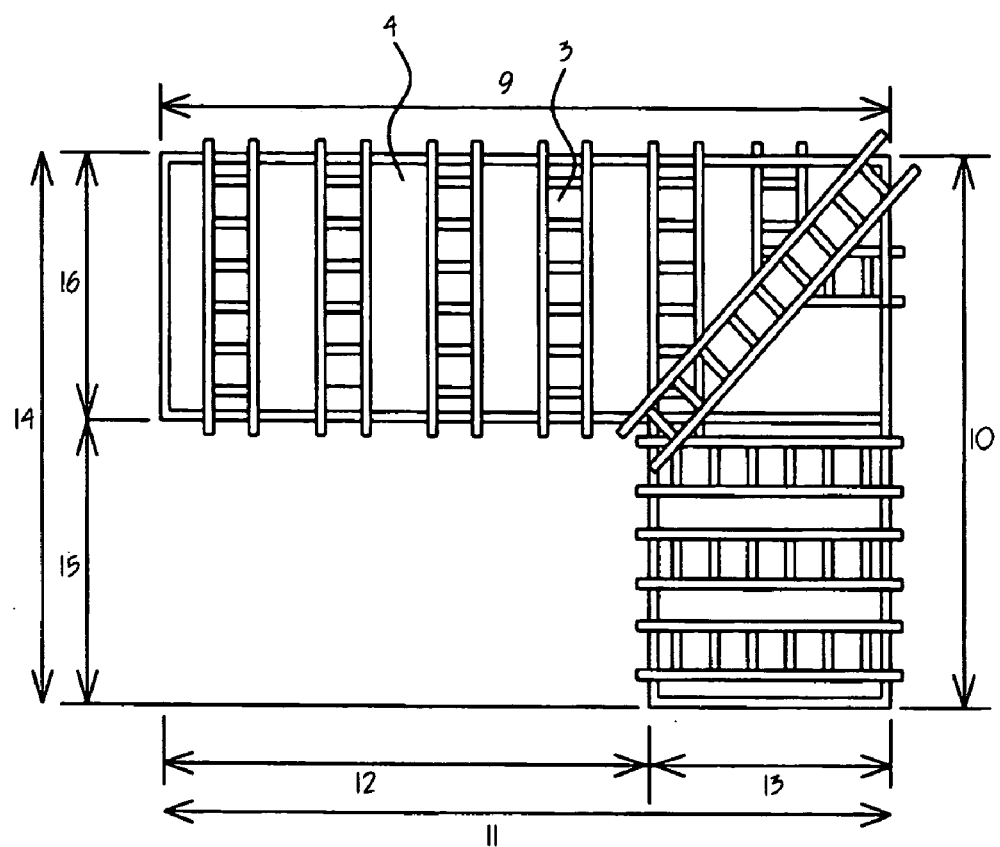
FIG. 3 is a plan view of the solar cell module plate supporting frame structure.

FIG. 3 is a plan view of the solar cell module panel supporting frame structure (1) showing relative position of the maintenance accesses (3) and solar cell module mounts (4). The width of a solar cell module plate (5) mount (4) is 180 cm (6 feet). The width of a maintaining access (3) is 90 cm. The solar cell module mount (4) and the maintaining access (3) are installed alternately side by side.

Figure 4:
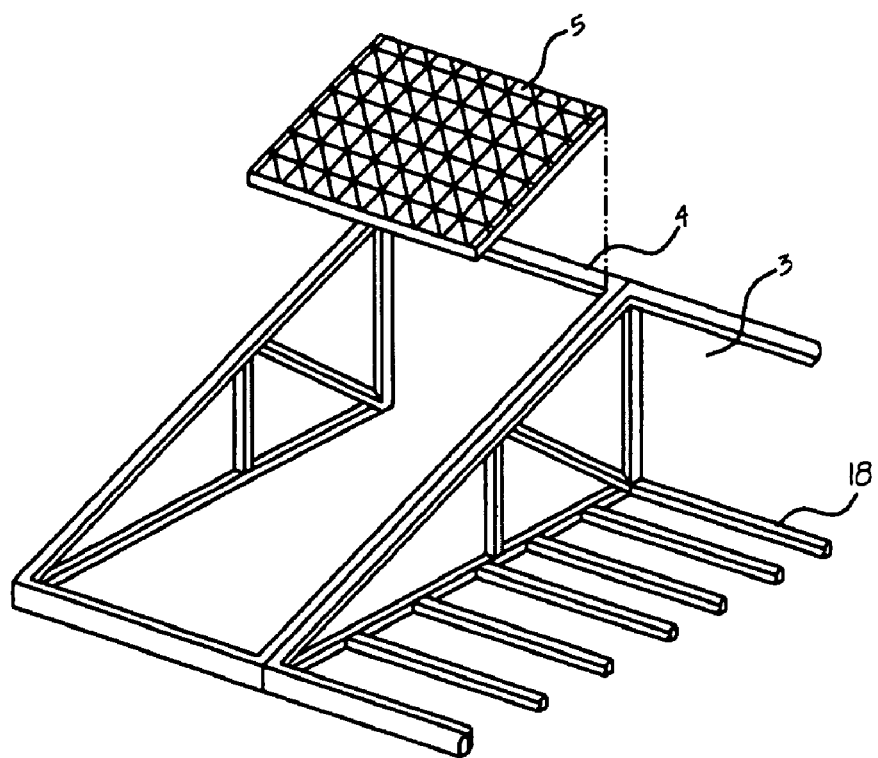
FIG. 4 is a perspective cross sectional view along the A–A' in FIG. 1.

FIG. 4 is a perspective cross sectional view along the A–A' in FIG. 1 showing the relative position of the maintenance access (3), the solar cell module mounts (4) and the solar cell module plates (5). When installing the solar cell module plates (5) on the mounts (4) and cleaning the module plates (5), a worker steps on the crossing bars (18) welded between to the bottom of the neighboring mounts (4). As the length of the arms of average adults are 50 cm to 100 cm and the width of the module plate (5) is 180 cm, it is very hard to clean the other side of the module plate (5). The lay out of the current application allows a worker to approach to both sides of every solar cell module plate (5) through the maintaining accesses (3) located on both side of each mount (4). It enables frequent cleaning of the surface of every solar cell module plate (5) to increase the efficiency of collecting sunlight and electric power generating.

Figure 5:
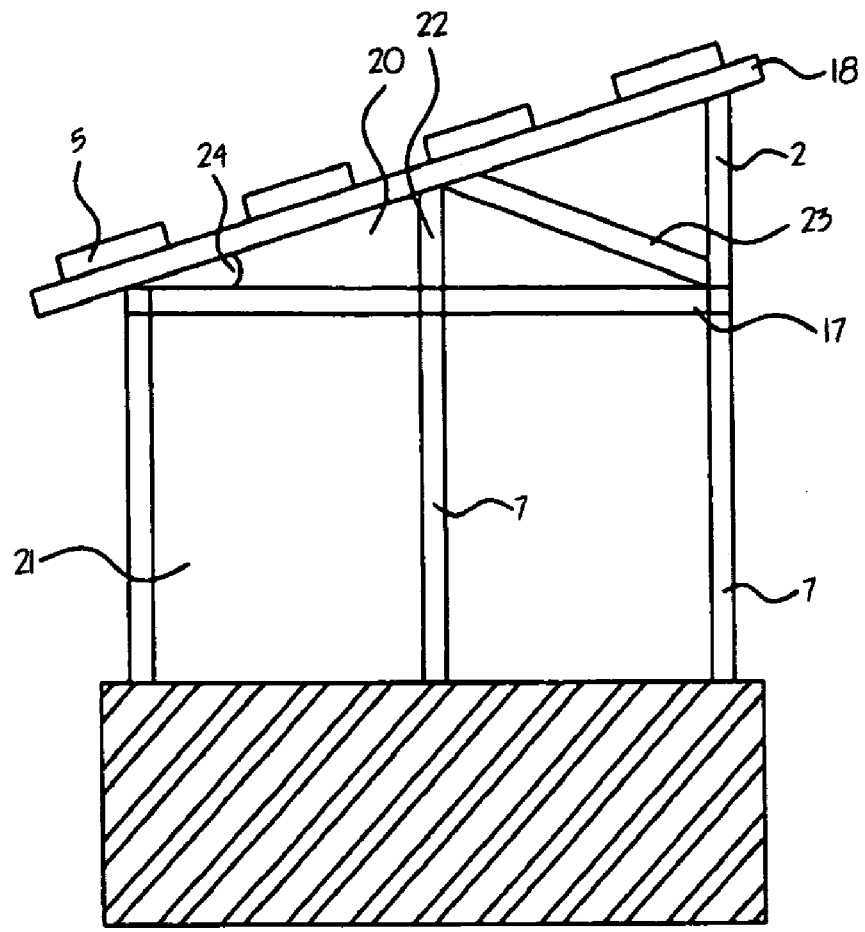
FIG. 5 is a side view of the solar cell module plate supporting frame structure showing the relative position of the top sloped surface and the horizontal base.

FIG. 5 is a side view of the solar cell module panel supporting frame structure (1), view from B and C in FIG. 1, showing the relative position of the top sloped surface (18) and the horizontal upper base (17). The overall shape of the side view is a rectangular triangle (20) mounted on a square (21). The triangle (20) shape is developed by adding 90 cm (3 feet) long square metal pipe (2) vertically to the vertical pipes (7), which locates on the longest side (9) and the second longest side (10). As a result, the height of the vertical pipes locates on both of the sides (9) and (10) becomes 360 cm (12 feet). A vertical pipe (22) is located on the center of the horizontal base (17) and another crossing metal pipe (23) is added to form an equilateral triangle in the rectangular triangle (20). Side view of all the solar cell module mounts (4) has the same shape as an equilateral triangle in a rectangular triangle. Another vertical metal pipe (7) connects the vertical pipe (22) and the base (8). This structure sustains the weight of the solar cell module plates (5) placed on the top sloped surface (18). The angle (24) between the horizontal base (17) and the top sloped surface (18) is 3 degree to 75 degree deepens on the latitude of the place where the solar cell module plates (5) are installed.

Figure 6:
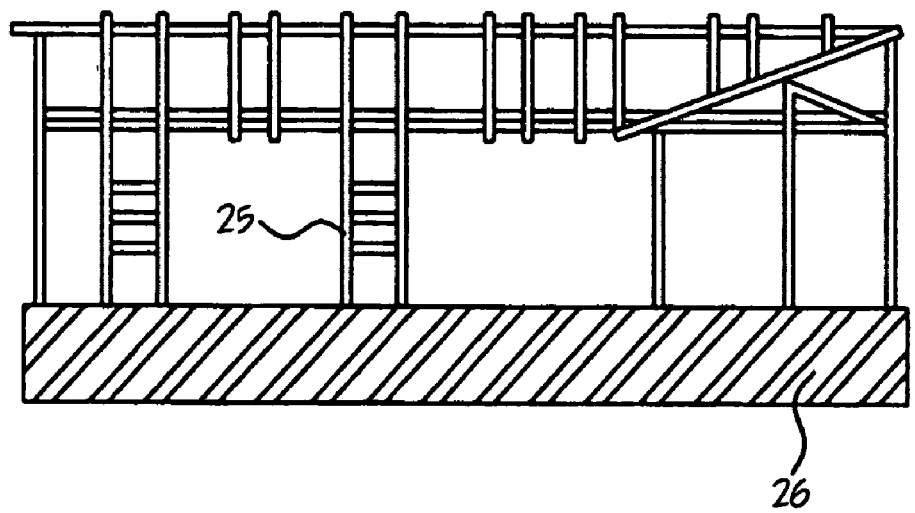
FIG. 6 is a front view of the solar cell module plate supporting frame structure seen from the direction B in the FIG. 1.

FIG. 6 is a front view of the solar cell module plate supporting frame structure seen from the direction B in the FIG. 1. Ladders (25) for climbing to the maintenance access (3) are shown. Two ladders are connected to the first and third maintenance accesses (3) from the left. The other ladder (25) attached to the eastern wing is not shown in the FIG. 6. Whole structure is mounted on an existing house (26).

What is claimed is:

1. A self sustaining solar cell module panel supporting frame structure made of 5 cm by 5 cm square carbon steel pipes having 1) an upper face equipped with maintenance accesses having 90 cm width and solar cell module mounts, which are installed on an upper base with a slope of between 3 degree to 75 degree, on which pluralities of solar cell module plates of 180 cm by 76 cm are mounted thereon, and 2) a lower part that is in cubic form made with twenty 5 cm by 5 cm square carbon steel pipes of 274 cm long that are welded vertically between an "L" shape lower base and another "L" shape upper base, both of which have a longest side of 1,890 cm long, second longest side of 1,110 cm long, third longest side of 1,230 cm long, fourth longest side of 630 cm long, fifth longest side of 630 cm long, and sixth longest side of 480 cm long.

2. A self sustaining solar cell module panel supporting frame structure of claim 1, wherein the maintenance accesses and the solar cell module mounts are installed alternately.

3. A self sustaining solar cell module panel supporting frame structure of claim 1, wherein the third longest side and fourth longest side are facing the longest side and the fifth longest side and sixth longest side are facing the second longest side.

* * * * *